(12) United States Patent (10) Patent No.: US 8,775,110 B2
Dutton (45) Date of Patent: *Jul. 8, 2014

(54) CORIOLIS FLOWMETER WITH ZERO CHECKING FEATURE

(75) Inventor: Robert E. Dutton, Louisville, CO (US)

(73) Assignee: Invensys Systems, Inc., Foxboro, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/179,902

(22) Filed: Jul. 11, 2011

(65) Prior Publication Data

US 2011/0259077 A1 Oct. 27, 2011

Related U.S. Application Data

(63) Continuation of application No. 12/016,574, filed on Jan. 18, 2008, now Pat. No. 7,979,230, which is a continuation of application No. 11/157,157, filed on Jun. 21, 2005, now Pat. No. 7,337,084.

(51) Int. Cl.
*G01F 25/00* (2006.01)

(52) U.S. Cl.
CPC .................................. *G01F 25/0007* (2013.01)
USPC .......................................................... 702/100

(58) Field of Classification Search
CPC .................................................. G01F 25/0007
USPC .......................................................... 702/100
See application file for complete search history.

(56) References Cited

U.S. PATENT DOCUMENTS

| | | | |
|---|---|---|---|
| 4,676,112 A | 6/1987 | Uematsu et al. | |
| 4,817,448 A | 4/1989 | Hargarten et al. | |
| 4,852,409 A | 8/1989 | Herzl | |
| 4,996,871 A | 3/1991 | Romano | |
| 5,228,327 A | 7/1993 | Bruck | |
| 5,321,991 A | 6/1994 | Kalotay | |
| 5,419,189 A | 5/1995 | Lew et al. | |
| 5,524,084 A | 6/1996 | Wang et al. | |
| 5,672,832 A | 9/1997 | Cucci et al. | |
| 5,796,012 A | 8/1998 | Gomi et al. | |
| 6,152,177 A | 11/2000 | Gerner et al. | |
| 6,243,661 B1 | 6/2001 | Baldwin et al. | |

(Continued)

FOREIGN PATENT DOCUMENTS

DE 43 23 028 A1 1/1995

OTHER PUBLICATIONS

English Abstract of DE 43 23 028, Jan. 1995.*

(Continued)

*Primary Examiner* — Michael Nghiem
(74) *Attorney, Agent, or Firm* — Edward S. Jarmolowicz, Esq.

(57) ABSTRACT

Descriptions are provided for implementing flowmeter zero checking techniques. In operating a flowmeter, it may be the case that, even if previously calibrated, the flowmeter will produce erroneous measurements, will indicate a non-zero flow during a period of zero flow. Therefore, zero checking features are provided that allow for fast and accurate determinations of the zero-flow values, for use in adjusting later measurements. The zero-checking features include a button attached to an exterior of a flowmeter, so that it is easily accessible to an operator of the flowmeter. The button, in conjunction with an internal zero checking system, allows for a display of a zero value in response to a request from the operator of the flowmeter.

12 Claims, 6 Drawing Sheets

(56) References Cited

U.S. PATENT DOCUMENTS

| | | |
|---|---|---|
| 6,272,438 B1 | 8/2001 | Cunningham et al. |
| 6,311,136 B1 | 10/2001 | Henry et al. |
| 6,367,336 B1 | 4/2002 | Martina et al. |
| 6,374,190 B2 | 4/2002 | Schupfner |
| 6,378,354 B1 | 4/2002 | Sharp |
| 6,505,519 B2 | 1/2003 | Henry et al. |
| 6,687,635 B2 | 2/2004 | Horne et al. |
| 6,997,032 B2 | 2/2006 | Mattar |
| 7,185,526 B2 * | 3/2007 | Mattar ............ 73/1.34 |
| 7,337,084 B2 | 2/2008 | Dutton |
| 7,690,240 B2 * | 4/2010 | Mattar ............ 73/1.34 |
| 7,979,230 B2 * | 7/2011 | Dutton ............ 702/100 |
| 2004/0200259 A1 | 10/2004 | Mattar |
| 2005/0193832 A1 * | 9/2005 | Tombs et al. ............ 73/861 |
| 2006/0089544 A1 * | 4/2006 | Williams et al. ............ 600/300 |
| 2006/0287839 A1 | 12/2006 | Dutton |

OTHER PUBLICATIONS

Endress & Hauser, 'promass 63—Mass Flow Measuring System,' BA 014D/06/en/08.97, 7 pages, 1997.

Extended European Search Report regarding related application serial No. EP 12162715.2 dated Feb. 5, 2013.

\* cited by examiner

CORIOLIS FLOWMETER WITH ZERO CHECKING FEATURE

CROSS-REFERENCE TO RELATED APPLICATION

This application is a continuation of U.S. patent application Ser. No. 12/016,574, filed Jan. 18, 2008, titled CORIOLIS FLOWMETER WITH ZERO CHECKING FEATURE, now U.S. Pat. No. 7,979,230, which is a continuation of U.S. patent application Ser. No. 11/157,157 filed Jun. 21, 2005, now U.S. Pat. No. 7,337,084, titled SWITCH-ACTIVATED ZERO CHECKING FEATURE FOR A CORIOLIS FLOWMETER. The prior applications are hereby incorporated by reference in their entirety.

TECHNICAL FIELD

This description relates to flowmeters.

BACKGROUND

Flowmeters provide information about materials being transferred through a conduit. For example, mass flowmeters provide a measurement of the mass of material being transferred through a conduit. Similarly, densitometers provide a measurement of the density of material flowing through a conduit. Mass flowmeters also may provide a measurement of the density of the material.

For example, Coriolis-type mass flowmeters are based on the Coriolis effect, in which material flowing through a conduit is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

According to one general aspect, a method includes detecting a manual operation of an input device that is connected to a controller of a flowmeter, the controller being operable to output measurements of a mass flow rate of a fluid within a vibratable flowtube associated with the flowmeter. The method also includes determining that the manual operation of the input device corresponds to a request for checking a zero flow rate calibration value that is present during a time of zero flow of the fluid within the flowtube, performing an averaging operation on a series of the measurements over a pre-determined time period and during the time of zero flow, to obtain an averaged zero flow calibration value, and outputting the zero flow calibration value, in response to the request.

Implementations may include one or more of the following features. For example, detecting the manual operation of the input device may include detecting operation of a switch that is connected to a casing of the controller. Operation of the switch may be detected through a contact input connected to the switch and to the controller, where the switch is accessible externally to the casing, and without requiring direct access to the controller within the casing. Determining that the manual operation of the input device corresponds to the request for checking the zero flow rate calibration value may include determining that switch is activated for greater than a second predetermined time.

Outputting the zero flow calibration value may include displaying the zero flow calibration value on a display associated with the controller. Additionally or alternatively, outputting the zero flow calibration value may include outputting a standard deviation of the zero flow calibration value.

Detecting the manual operation of the input device that is connected to the controller of the flowmeter may include detecting the manual operation of the input device that is connected to the controller of a Coriolis flowmeter.

In another example, the method may further include modifying subsequent measurements of the controller during a subsequent time of non-zero flow, based on the zero flow calibration value, to obtain adjusted measurement outputs, connecting a proving meter to pulse output terminals connected to the controller, and testing an accuracy of the flowmeter, based on outputs of the proving meter and the adjusted measurement outputs of the flowmeter.

The method may include performing the averaging operation multiple times over each of a number of periods of zero flow, detecting a trend of change in resulting zero flow calibration values, and outputting an alarm signal notifying impaired performance of the flowmeter, based on the trend.

The method may include detecting that a magnitude of the zero flow calibration value exceeds a pre-determined value, and outputting an alarm signal notifying impaired performance of the flowmeter, based on the detection of the magnitude exceeding.

According to another general aspect, a system includes a controller that is operable to output drive signal information for driving a vibratable flowtube, and receive sensor information reflecting a vibration of the flowtube. A measurement system is associated with the controller that is operable to generate measurements of a mass flow rate of a fluid within the flowtube, based on the sensor information. A manually-activated input device is connected to an exterior of the controller, for activation by an operator of the controller. A zero checking system is associated with the controller and is in communication with the input device and the measurement system. The zero checking system is operable to detect the activation of the input device and perform an averaging operation on a series of measurements from the measurement system over a pre-determined time period and during a time of zero flow of the fluid within the flowtube, to obtain an averaged zero flow calibration value, in response to the activation. The system also may include a display for displaying the averaged zero flow calibration value.

Implementations may include one or more of the following features. For example, the system may include a casing containing the controller, wherein the input device is located externally to the casing and is connected to the controller through a contact input of the casing. The input device may be included within a connection module that is attached to the contact input. The input device may be a switch, and the activation of the input device may include pressing of the switch by the operator.

The zero checking system may be further operable to distinguish between a first type of activation of the input device, for which no determination of the zero flow calibration value desired, and a second type of activation of the input device, for which determination of the zero flow calibration value is desired. The controller may be a Coriolis flowmeter controller.

The zero checking system may be operable to de-activate a low-flow cutoff system for masking the measurements of the mass flow rate below a defined value, in response to the activation of the manually-activated input device.

According to another general aspect, an apparatus comprising a storage medium having instructions stored thereon is provided. The instructions may include a first code segment for controlling and analyzing a vibration of a flowtube, so as to determine measurements of a mass flow rate of a fluid within the flowtube, a second code segment for receiving an activation signal corresponding to an activation of a switch, and for analyzing the activation signal to determine that a zero-checking operation is desired, a third code segment for performing the zero-checking operation by analyzing the measurements during a time of an actual zero flow rate of the fluid, to determine a zero-flow calibration value, and a fourth code segment for outputting the zero-flow calibration value.

Implementations may include one or more of the following features. For example, the third code segment may include a fifth code segment for averaging the measurements over a pre-determined time period within the time of actual zero flow rate of the fluid, and for determining a standard deviation associated with the averaging of the measurements.

The fourth code segment may output the zero-flow calibration value to a display screen for display. The second code segment may include a fifth code segment for receiving the activation signal from a host computer in communication with the apparatus.

The details of one or more implementations are set forth in the accompanying drawings and the description below. Other features will be apparent from the description and drawings, and from the claims.

DETAILED DESCRIPTION

Types of flowmeters include digital flowmeters. For example, U.S. Pat. No. 6,311,136, which is hereby incorporated by reference, discloses the use of a digital flowmeter and related technology including signal processing and measurement techniques. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, commonly-assigned U.S. Pat. No. 6,505,519, which is incorporated by reference, discloses the use of a wide gain range, and/or the use of negative gain, to prevent stalling and to more accurately exercise control of the flowtube, even during difficult conditions such as two-phase flow.

Although digital flowmeters are specifically discussed below with respect to FIGS. 1 and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which a Coriolis flowmeter system uses various control systems and related elements to measure a mass flow, density, and/or other parameters of a material(s) moving through a flowtube or other conduit.

Figure 1A:
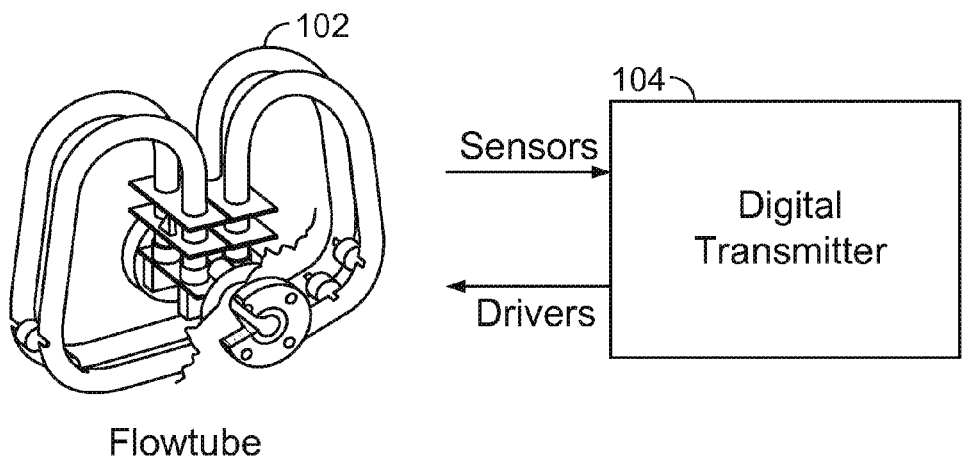
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of, for example, a (traveling) fluid, as referred to above. In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102. Examples of the digital transmitter 104 being used with a bent flowtube are provided in, for example, commonly-assigned U.S. Pat. No. 6,311,136.

Figure 1B:
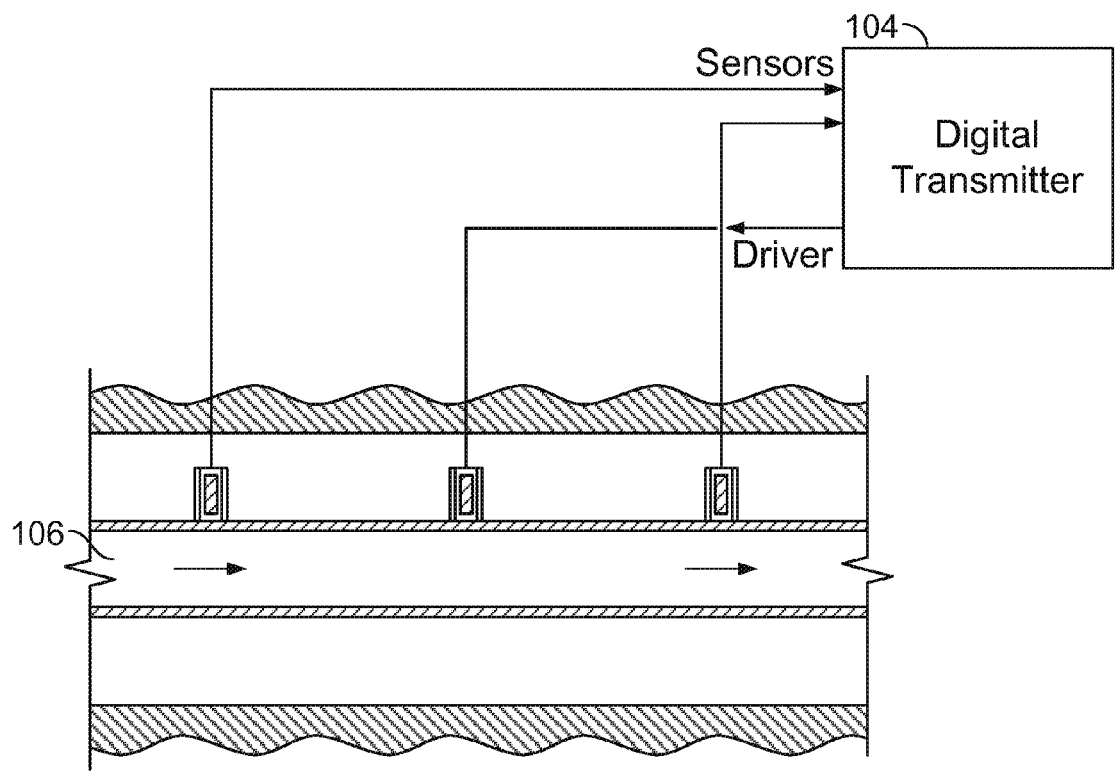
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50-110 Hz, while the straight flowtube 106 may operate at a frequency of, for example, 300-1,000 Hz.

Figure 2:
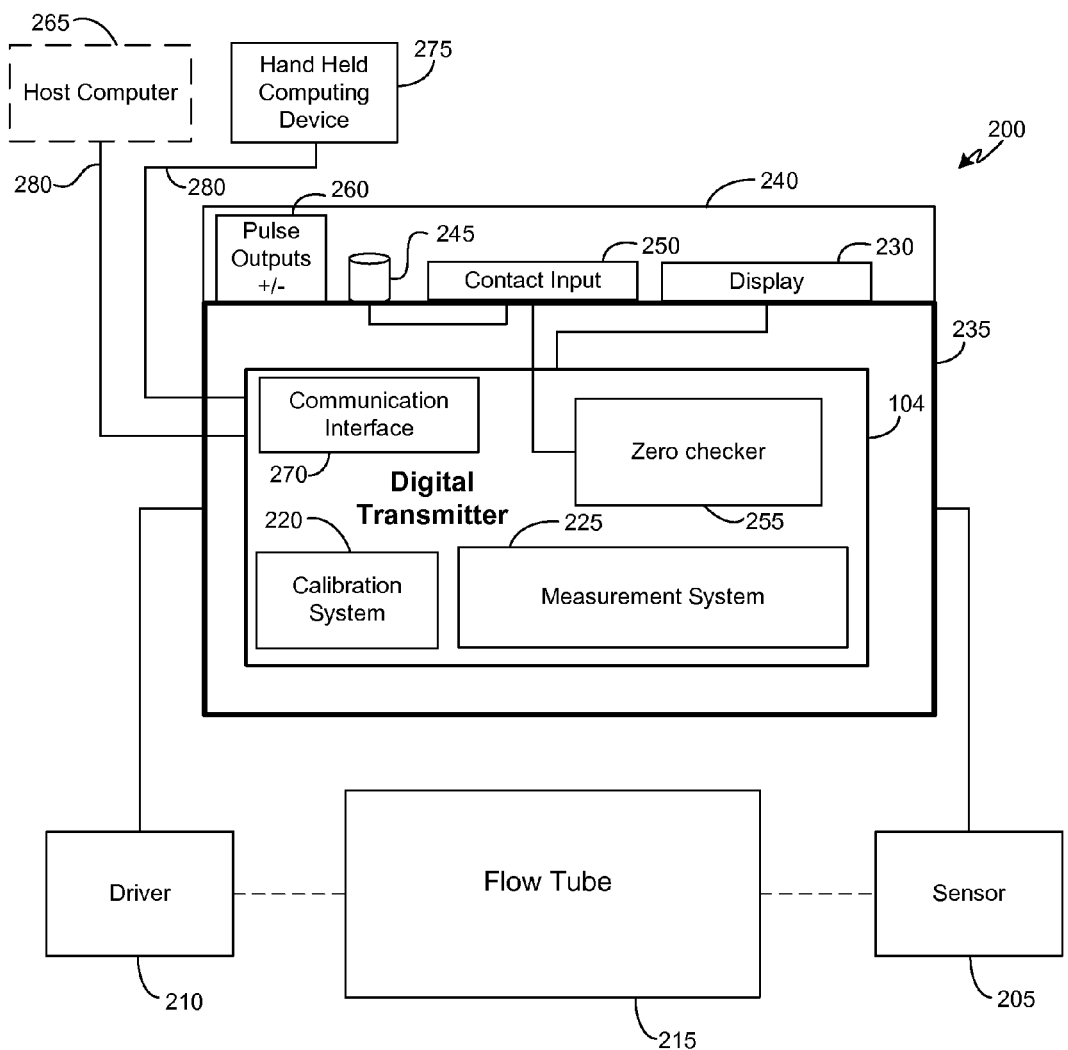
FIG. 2 is a block diagram of a Coriolis flowmeter.

Referring to FIG. 2, a digital mass flowmeter 200 includes the digital transmitter 104, one or more motion sensors 205, one or more drivers 210, a flowtube 215 (which also may be referred to as a conduit, and which may represent either the bent flowtube 102, the straight flowtube 106, or some other type of flowtube), and a temperature sensor. The digital transmitter 104 may be implemented using one or more of, for example, a processor, a Digital Signal Processor (DSP), a field-programmable gate array (FPGA), an ASIC, other programmable logic or gate arrays, or programmable logic with a processor core.

The digital transmitter 104 generates a measurement of, for example, density and/or mass flow of a material flowing through the flowtube 215, based at least on signals received from the motion sensors 205. The digital transmitter 104 also controls the drivers 210 to induce motion in the flowtube 215. This motion is sensed by the motion sensors 205.

Density measurements of the material flowing through the flowtube are related to, for example, the frequency of the motion of the flowtube 215 that is induced in the flowtube 215 by a driving force supplied by the drivers 210, and/or to the temperature of the flowtube 215. Similarly, mass flow through the flowtube 215 is related to the phase and frequency of the motion of the flowtube 215, as well as to the temperature of the flowtube 215.

The temperature in the flowtube 215, which may be measured using a temperature sensor, affects certain properties of the flowtube, such as its stiffness and dimensions. The digital transmitter 104 may compensate for these temperature effects. Other sensors may be included, such as, for example, a gas void fraction sensor that is operable to determine what percentage of a material in the flowtube 215, if any, is composed of a gas, or a pressure sensor that is operable to sense a pressure of a material flowing through the flowtube 215.

In performing measurements of mass flow (and/or density), calibration of the flowmeter may be required in order to maintain system performance, particularly over long periods of time and/or extensive operation of the flowmeter. One calibration technique is known as "zeroing" or "a zero calibration." In a zeroing process, a flow of material through the flowtube 215 is stopped (for example, upstream and downstream valves may be closed) during a time when the flowtube 215 is filled with the material. As a result, there is a zero flow of the material, which should, ideally, lead to a corresponding reading of zero flow output by the flowmeter.

For various reasons, however, it may be the case that the flowmeter outputs a non-zero (i.e., erroneous) flowrate during a time of zero flow. In these cases, the (erroneous) non-zero flowrate at zero flow may be used as a calibration factor; that is, for example, it may be subtracted from (or added to) a measured flow, so as to obtain an accurate, i.e., zero-corrected, reading of the flow during future readings.

For example, when more than one of the sensor(s) 205 are used, there may be some phase difference in signals that are output from the sensors 205 that is inherent to the structure or operation of the sensors 205 relative to one another. Even if attempts are made to "balance" the sensors 205 with respect to one another, it may be the case that, since the mass flow rate of the fluid in the flowtube 215 may be determined at least partially based on such phase differences, the transmitter 104 may detect a non-zero mass flow rate of the fluid in the flowtube 215 during zero flow. Similarly, non-zero mass flow rates may be detected during zero flow, due to, for example, external vibrations or disturbances of the transmitter 104, or due to a change in a type of fluid within the flowtube 215, or due to a changed configuration of the flowtube 215 and/or surrounding piping, or for other reasons.

Moreover, in some cases, such non-zero mass flow rates detected during zero flow may be extremely transient, and may be prone to exhibit a wide range of quickly-changing values, during a relatively short period of time. In many applications, such values may be effectively discarded or ignored, if they are very small relative to an amount of fluid being processed, or if a high degree of accuracy is not required.

In other applications, however, non-zero mass flow rates detected during zero flow may be very important to determining mass flow rates of fluid through the flow tube 215. For example, in gas and oil applications, in which an operator uses the flowmeter 200 to determine an amount of, for example, oil that is being transferred (measured in barrels per day, or bpd), then a number of barrels of oil may correlate with a large dollar value, so that high levels of accuracy and repeatability are desirable.

In FIG. 2, then, the digital transmitter 104 includes various elements designed to quickly, accurately, and easily determine a current zero value (i.e., a non-zero mass flow rate detected during zero flow). Such zero checking capabilities and features further provide for zero detection in a manner that does not require access to internal workings of the transmitter 104, and that allows for a high repeatability of measurements from the flow meter 200.

That is, FIG. 2 includes a calibration system 220 that refers to a system for implementing a pre-set zero value, in conjunction with a measurement system 225. The measurement system 225 refers generically to the systems of the transmitter 104 that measure, for example, a density or mass flow rate of the fluid within the flowtube 215, based on signals from the sensors 205, as described above.

As also described, the resulting mass flow rate values may include non-zero mass flow rates detected during zero flow, which may be, for example, factory-measured to determine an appropriate calibration value. This calibration value may then be used to correct mass flow rate values that are determined/output by the measurement system 225, for display on a display 230.

In other words, the ideal or theoretical situation is that the measurement system 225 outputs a zero value at zero flow, and the calibration system 220 is not needed. In practice, this is often not the case, and so the calibration system 220 is configured with the intent of altering the output of the measurement system 225 by a measured zero-flow rate value, so that the output of the transmitter 104 itself is zero at zero flow. Even with the calibration system 220, however, as described, the resulting mass flow rate that is output, particularly over time and over a variety of circumstances, may be non-zero at zero flow. That is, in many cases, the practical effect of the calibration system 220 is to reduce, but not entirely to eliminate, a non-zero reading at zero flow.

In some circumstances, the calibration system 220 may be re-configured with additional or corrected zero-flow calibration values. However, such a re-configuration may require a level of access to the operation of the transmitter 104 that is either not available or not desired. For example, once the digital transmitter 104 is manufactured and sold to a customer, then that customer may not have the time, the tools, the expertise, or the desire to re-configure the calibration system 220.

In particular, when the flow meter 200 is used in field operations, such as the transfer of large volumes of oil, as mentioned above, it may be impractical to expect or require available technicians to have the resources to re-configure the calibration system 220. For example, such a re-configuration may require access to the transmitter 104 within a packaging or casing 235, which may be difficult or inconvenient. Further, opening the casing 235 may expose certain inputs/outputs or voltages of the transmitter 104, the mis-handling of which could lead to impairment or failure of the transmitter 104.

In such cases, a "low-flow cutoff" may be established, which is an artificial flow rate value determined by an operator, below which the transmitter automatically outputs a value of zero for the determined flow rate. In other words, such a cutoff masks the appearance of non-zero mass flow rates during zero flow, without really accounting for the effect(s) thereof. Such a low-flow cutoff may make an operation of the flow meter 200 appear to be more accurate than the flow meter 200 actually is, and does not do away with a need for field operators to access and determine a current zero flow value for the flow meter 200.

Thus, in FIG. 2, a secondary casing and/or lid 240 is provided, which exposes certain functionality of the flow meter 200, as described in more detail below, without exposing an interior of the casing 235. In particular, the lid 240 may be lifted to expose a switch or button 245, which is functionally connected to the digital transmitter 104 by way of a contact input 250 that is associated with the transmitter 104 and with the casing 235.

The button 245 may be used, as described in various examples below, to check a current value of a non-zero mass flow rate detected at zero flow (referred to hereafter as a "zero value," a "zero flow value," or the like), in an easy, accessible, reliable, and accurate way. For example, once a zero flow rate is established through the flow tube 215, by, for example, closing upstream and downstream valves associated with the flow, then a simple pressing and/or holding of the button 245 outputs a current zero flow reading, averaged over some predetermined time, and using the display 230. This current zero flow reading may then be subtracted from, or added to, future readings of the flow meter 200, in order to obtain a more accurate measurement therefrom.

Although instantaneous zero flow values may be obtained simply by reading the display 230, such instantaneous values may be inaccurate, or may be largely or completely useless in practical situations. For example, if an operator of the flow meter 200 simply establishes a zero flow condition and reads the display 230, the display will, in many circumstances, display transient, changing, and widely-varying zero flow values. In this case, the operator may be forced to use the worst, highest, or most extreme zero flow value, in order to ensure a baseline level for readings of the flow meter 200, and in order to ensure that flow volumes calculated by the flow meter 200 are, at the least, not under-reported, even if they are inaccurate.

Thus, generally speaking, pressing the button 245 activates a zero checker 255 associated with the transmitter 104, which calculates a current, e.g., an average, reading of the zero value, based on outputs of the measurement system. Such a reading will generally be more accurate and more reliable than a sight-reading performed by the operator, and will thus lead to improved measurements being used by the operator.

In one implementation, the zero checker 255 is operable, upon activation of the button 245, automatically to disable or remove any low-flow cutoff value that may presently be instituted with respect to the flow meter 200. For example, as referenced above, the digital transmitter may be configured to display a zero value on the display 230, anytime that a flow rate output of the flow meter 200 is less than some pre-determined value. Such a low-flow cutoff value may be useful for the sake of appearance or convenience, but, in fact, may mask non-trivial errors in the read-out of the flow meter 200. Thus, in this implementation, activation of the button 245 and, thereby, the zero-checker 255, disables any existing low-flow cutoff value that may be in effect, so that an operator may observe any transient zero-flow read-outs that occur, as well as the final, averaged zero value that is provided on the display 230.

Figure 2A:
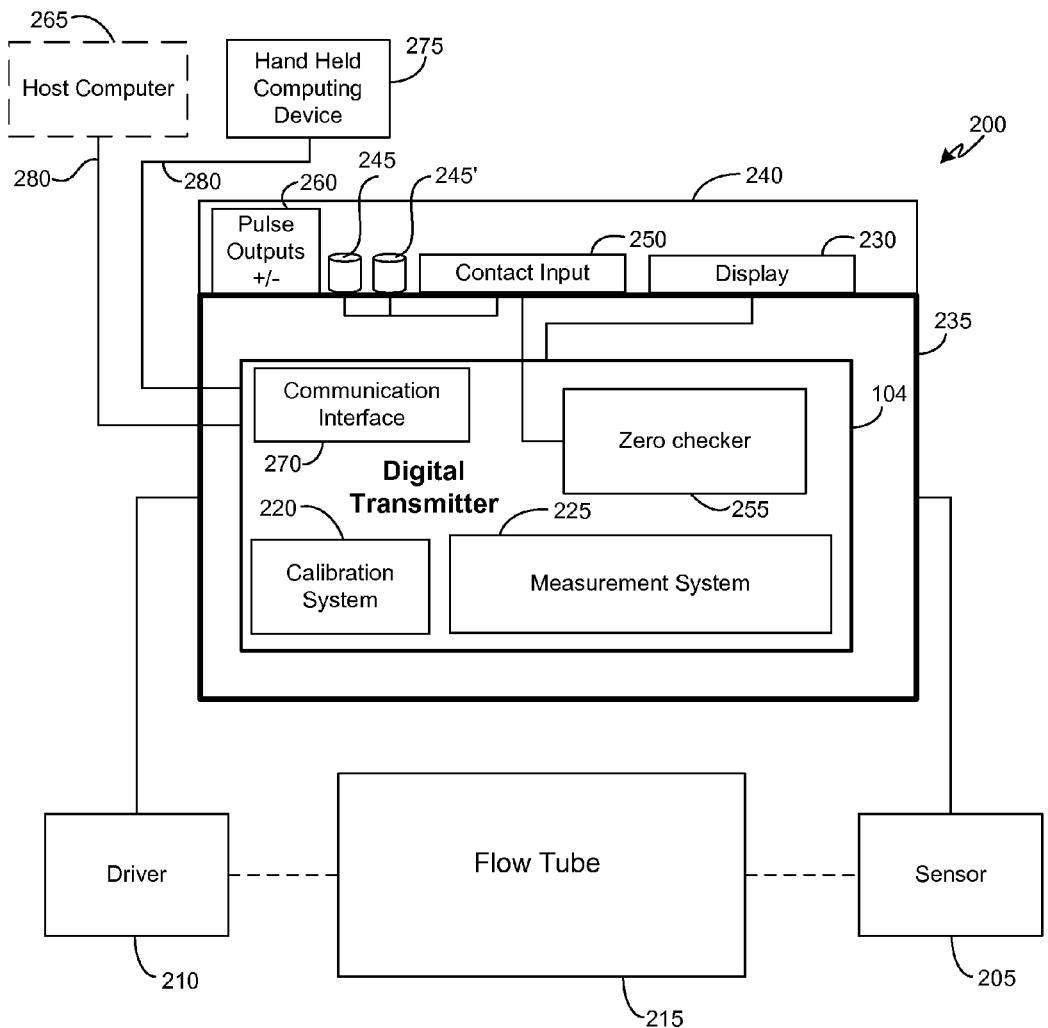
FIG. 2A is a block diagram of another embodiment of a Coriolis flowmeter.

Although the button 245 is illustrated in FIG. 2 as a single button, it should be understood that multiple buttons may be used, as illustrated in FIG. 2A, e.g., a first button 245 to close the flowtube such that the fluid contained in the flowtube is stationary and initiate a zero flow reading and a second button 245' to end a zero flow reading and to open the flowtube such that the fluid contained in the flow tube flows. Also, other implementations may use other input techniques than a button, and may use, for example, a switch, a turn-knob or dial, a toggle, a lever, or any other manually operated input device.

Also, although the display 230 is illustrated in FIG. 2 as being under the lid 240, it should be understood that the display 230 may be implemented separately from the lid 240, so that the display 230 remains visible at all times during use of the flow meter 200. Alternatively, there may be an opening or window in the lid 240 that allows viewing of the display 230. As another alternative, the button 245 and the pulse outputs 260 may be implemented together in a single module, e.g., a junction box as described below, and may be jointly connected to the contact input 250 by way of the module.

Additionally, or alternatively, in FIG. 2, a host computer 265 may be used to send digital commands to the transmitter 104 by way of an integrated communication interface 270, in order to initiate a zero flow reading and to end a zero flow reading, and to return an average zero reading value to a digital register to be read by the host computer 265, for display in association with the host computer 265 or otherwise.

FIG. 2 also shows that a handheld device 275 may communicate with the transmitter 104 through communication interface 270. The handheld device 275 may include, among other types of suitable computing devices, a PDA style computing device or a personal computing device such as a laptop computer. The handheld device 275 may communicate with the transmitter 104 via the communication interface 270 through a communication link 280, which may include a wireless link (e.g. via a variety of infrared signals/protocols or radio frequency signals/protocols such as WiMax, WiFi, Bluetooth®, or other suitable wireless communication signals/protocols) or a wired connection. Communication between the handheld device 275 and the transmitter 104 may be through a direct communication link established only between the handheld device 275 and the transmitter 104, or may be established through a larger area communication infrastructure such as a process control network (e.g. represented by communication link 280) to which the handheld device 275, transmitter 104, as well as other process controllers or control systems are connected, including for example the host computer 265.

The handheld device 275 may include a user interface that emulates the display and user interface of the transmitter 104 so that information presented on the display 230 associated with the transmitter 104 is simultaneously presented in the user interface of the handheld device 275. The user interface of the handheld device 275 also may include a virtual button or an actual physical button or key that when selected or depressed will simultaneously activate the contact input 250 by way of the communication links described herein for activating the zero checker 255 and initiating the zero-checking operations.

Figure 3:
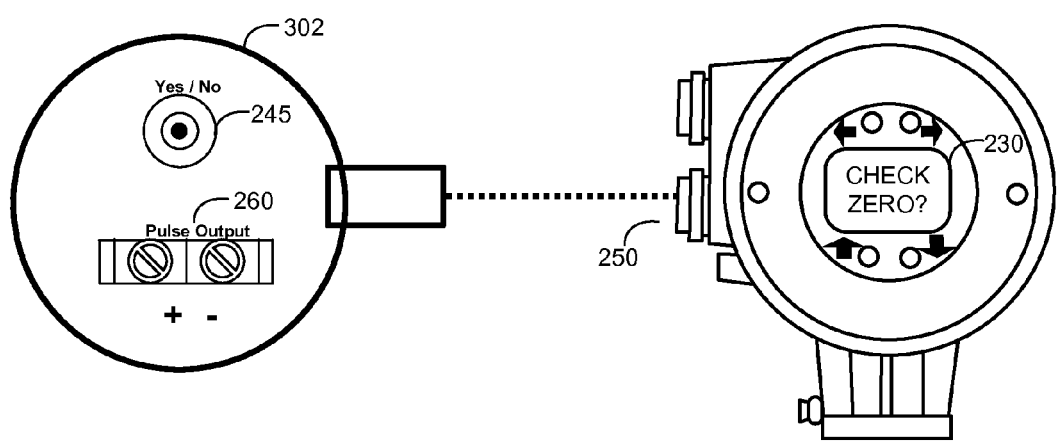
FIG. 3 is a block diagram of an implementation of the flowmeter of FIG. 2.

FIG. 3 is a block diagram of a flowmeter 300 that represents an implementation of the flowmeter of FIG. 2. In FIG. 3, the flowmeter 300 includes a junction box (j-box) 302, i.e., a box or module that is used to provide electrical/wiring connection, is used to house the button 245 and the pulse outputs 260. The j-box 302 generally corresponds, then, to the supplemental casing/lid 240 of FIG. 2, although the j-box 302 is not explicitly illustrated with a lid or cover in FIG. 3.

In FIG. 3, the button 245 may include a momentary closure, spring-return, push-button switch that is connected to the contact input (switch) 250. Further, the pulse outputs 260 may be wired/jumpered from a 24V DC supply of the transmitter 104, so that the pulse outputs 260 are self-powered.

Figure 4:
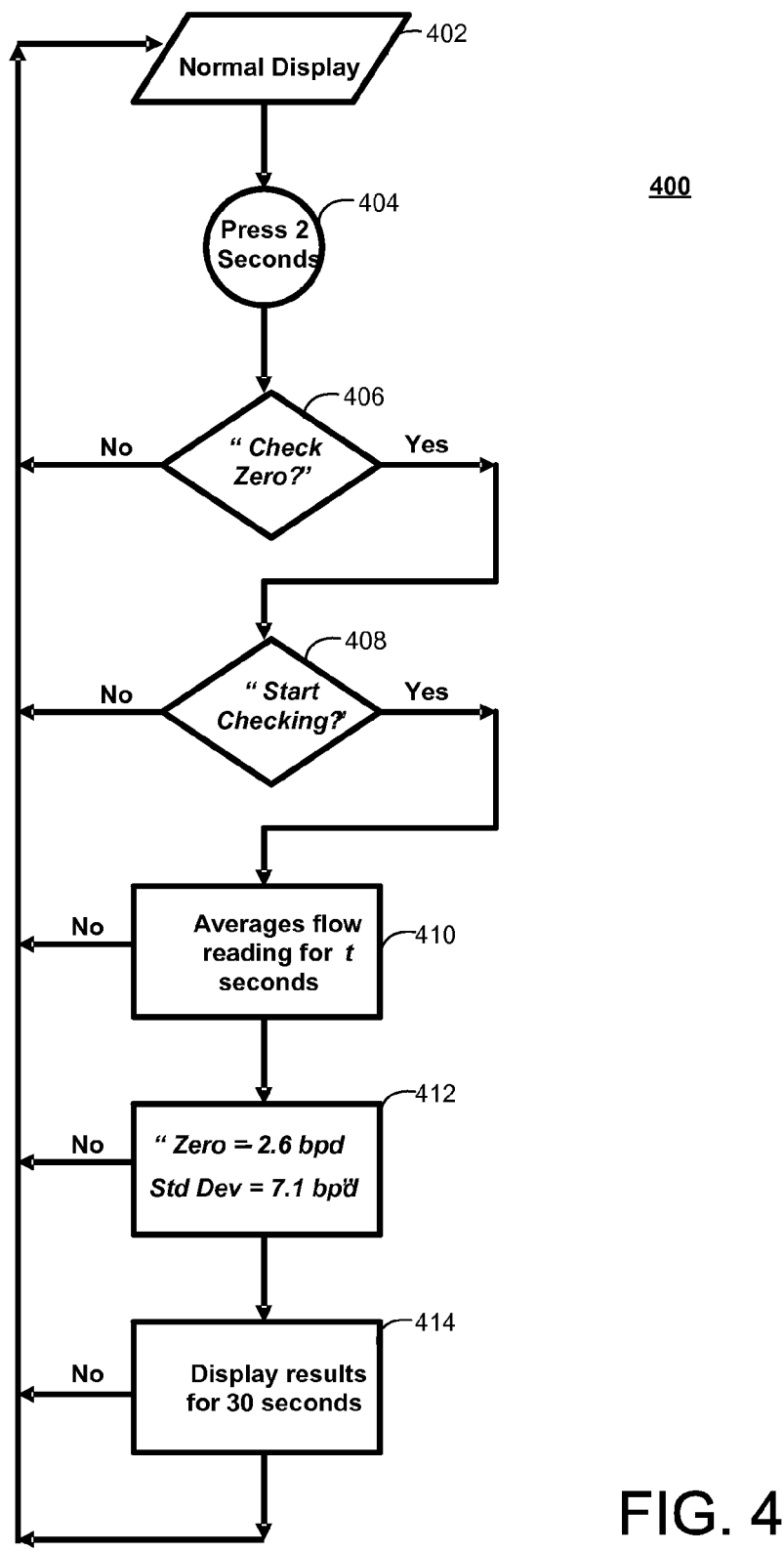
FIG. 4 is a flowchart illustrating a zero-checking operation.

FIG. 4 is a flowchart 400 illustrating a zero-checking operation for operating the flow meters 200 and 300 of FIGS. 2 and 3. In FIG. 4, it is assumed that a zero flow condition has been established within the flowtube 215, e.g., that upstream and downstream valves have been closed.

Then, the process begins with a normal display (402) on the display 230, e.g., with transient and widely-varying readings of non-zero flow rates, despite the fact that zero flow has been established. As described above, an operator of the flow meter may have to lift a lid or otherwise expose the display 230 for viewing.

By pressing the button 245 for some pre-determined time, e.g., two seconds (404), the operator may activate the zero checker 255, so that the display 230 reads "check zero?," as shown in FIG. 3 (406). If the operator does not wish to check the zero flow value, then the process may return to providing a normal display. In this case, the operator may indicate "no" as an answer to the "check zero?" query by pressing the button 245 for less than a second, or, more generally, for less than some pre-determined amount of time.

If the operator does wish to check the zero flow value, then the operator may indicate such a "yes" answer to the "check zero?" query by pressing the button 245 for two seconds or more, or, again more generally, for greater than some predetermined amount of time. In response to such an affirmative request, the zero checker 255 may present a "start checking?" query on the display 230 (408).

Here again, if the operator does not wish to start checking the zero flow value after all, then the process may return to providing a normal display. In this case, again, the operator may indicate "no" as an answer by pressing the button 245 for less than a second.

If the operator, however, indicates "yes" to the "start checking?" query, by pressing the button 245 for more than two seconds, then the zero checker 255 may automatically begin to input and average measurements from the measurement system 225, and may continue doing so for a pre-determined amount of time "t" seconds, such as, for example, thirty seconds.

As explained above, the non-zero mass flow rate values detected by the measurement system 225 during this time of zero flow may generally be transient and widely-varying, over the selected time period "t." If the operator were forced to determine a zero flow value based on such outputs, then the result would likely be either a "worst case scenario," which may result in unacceptably inaccurate readings, or would be an inaccurate estimate that is guessed by the operator, which may result not only in inaccurate measurements, but measurements which under-report an amount of fluid processed by the flow meter 200/300.

The zero-checker 255, however, determines an averaged zero flow value (410), and then outputs the averaged zero flow value and associated standard deviation value (412), which provides both increased accuracy and information as to an amount of variability of the zero flow value and associated measurements. In this way, the operator may quickly and easily obtain an improved zero flow value, which may be shown on the display 230 for some pre-determined amount of time, such as, for example, thirty seconds (414).

Figure 5:
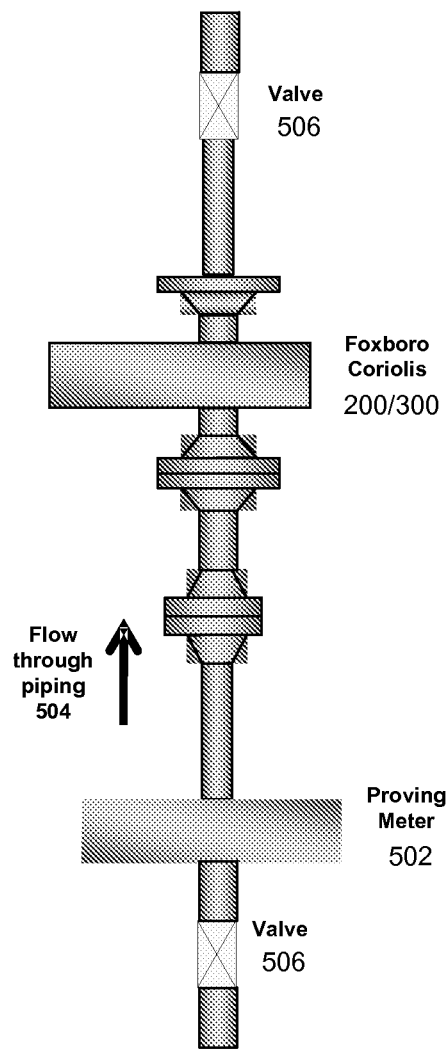
FIG. 5 is a block diagram of an application of the flowmeters of FIGS. 2 and 3.

FIG. 5 is a block diagram of an application of the flowmeters of FIGS. 2 and 3. Specifically, FIG. 5 illustrates a proving application that is common to, for example, the oil and gas industry, in which, again for example, barrels of oil are measured for transfer between two entities.

In a further example of such an application, a first entity is producing or possessing oil, which is being measured for transfer using the Coriolis flowmeter 200/300 of FIGS. 2 and 3. In such a case, the second, receiving, entity may wish to verify or prove an accuracy of the flowmeter 200/300, in order to ensure accuracy in determinations of an amount of oil being transferred.

As a result, a proving meter 502 is utilized in series with the flowmeter 200/300, and connected with piping or tubing 504. Generally speaking, the proving meter 502 allows for a known volume of fluid (oil) to pass therethrough, so that this known volume may be compared to a volume measured by the flowmeter 200/300. For example, a number of pulses output by the flowmeter 200/300 may be counted, for comparison to an output of the proving meter 502.

That is, depending on the type of meter used as the proving meter 502, the proving meter 502 may be connected directly to the pulse outputs 260 (not explicitly shown in FIG. 5), and pulses output by the flowmeter 200/300, representing a mass flow rate detected by the flowmeter 200/300, may be counted to see if they match an expected number that would correlate with the known volume of the proving meter 502.

One type of the proving meter 502 is known as a piston prover, or a compact prover, which operates by moving an internal piston to initiate a pulse counting process. A movement range of the piston corresponds to a known fluid volume, so that completion of the movement range signals a stop of the pulse counting operation.

By repeating this process multiple times, an accuracy and repeatability of the flowmeter 200/300 may be determined. From these values, a "meter factor" may be obtained, which may then be used with actual flow readings to determine an amount of oil being transferred. An advantage of the piston prover is a fast proving time, requiring only a relatively small volume of fluid for testing.

A second type of the proving meter 502 is known as a pipe prover, in which, somewhat similarly to the piston prover, a ball is launched from one end to the other of a U-shaped pipe, tripping a switch at each end of the pipe in the process. Since there is a known volume between switches, the pulses from the Coriolis meter pulse output 260 are counted between the switches, and compared between passes of the ball. The counts are then analyzed for repeatability and linearity. As a result, a meter factor can also be determined from this procedure, which represents an accuracy and/or repeatability measure of the associated flow meter. The pipe prover is generally capable of proving relatively larger volumes of fluid, but takes longer to do so.

In such an environment, the zero flow rate of the flowmeter 200/300 may be expressed as a number of barrels of oil a day by which the flowmeter 200/300 may be off. That is, if the zero flow rate is expressed as five barrels a day, then this value may be taken into account (subtracted or added) when determining an output of the flowmeter 200/300, and/or when performing the proving operation described herein. As may be seen, a large or inaccurate value of this measure may result in a relatively large dollar value of oil being miscalculated.

Such miscalculations may be avoided or minimized by obtaining an accurate, averaged value for a zero flow rate of the flowmeter 200/300, after obtaining zero flow by closing upstream and downstream valves 506. As described, the operator of the flowmeter 200/300 may simply press the button 245 to obtain an averaged zero flow value, which may thereafter be used during proving and other operations of the flowmeter 200/300.

Moreover, in a case where the resulting zero value is large, or is becoming larger over time, a determination may be made that a total re-calibration of the flowmeter 200/300 is required, or that some other defect of the flowmeter 200/300 has occurred. Similarly, if a variability of the zero flow value, as indicated by the standard deviation calculated by the zero checker 255, becomes large or begins to increase over time, then a determination may be made that the flowmeter 200/300 is in need of repair or replacement.

In such cases, a memory may be associated with an operation of the zero checker 255, for storing previously-detected zero flow calibration values. In this case, an alarm generator may be included in association with the zero checker 255, where the alarm generator includes logic rules for generating an alarm in response to a magnitude and/or rate of change of the zero flow calibration value(s).

Again, such determinations may be made more easily and more reliably with the use of the flowmeter 200/300 than with the use of a conventional flowmeter, where a large zero flow value may seem to indicate a potential problem with the flowmeter 200/300, but which may only be a transient zero flow value that is not particularly indicative of any larger problems. Similarly, as just referenced, use of the button 245 and zero checker 255 may allow an easier determination of trends of increasing zero flow values (or standard deviation values), as opposed to conventional flowmeters, in which a relatively large zero flow value may be followed by a relatively small value, so that trends in zero flow value changes may be difficult or impossible to discern.

As described above, various factors may conspire to result in a presence of an erroneous non-zero flow rate being output by a Coriolis flowmeter, even during a time of zero flow. Such factors may include, for example, varying densities of the fluids being processed, a presence of gas in an associated flowtube, a mechanical configuration of the flowmeter or related components, or changes in operating temperatures of the flowmeter.

Further, although fluids such as oil and gas are discussed above, it should be understood that many types of materials may be used in conjunction with the implementations described herein. For example, the zero checking techniques may be used in the context of other hydrocarbon materials, or of food and food-related materials, as well as cleaning materials. Similarly, the flowmeter and zero checking techniques may be used to measure density and/or mass flow of various gasses, including air, natural gas, and elemental gasses such as Helium. As a result, applications for these and related techniques are far-ranging, including food industries, drug production, oil and gas processing, and various other industries.

In all of these settings, the implementations described herein allow for fast, easy, and accurate determination of a current zero flow value, without requiring access to the internals of a digital transmitter or controller.

A number of implementations have been described. Nevertheless, it will be understood that various modifications may be made. For example, although the above discussion is provided in terms of zero flow values, it should be understood that the button 245 and zero checker 255 may be used to determine an average value during any flow condition of the flowmeter 200/300. Accordingly, other implementations are within the scope of the following claims.

What is claimed:

1. A system for calibrating a flowtube, the system comprising:
   a transmitter configured to induce motion in the flowtube containing fluid, the transmitter comprising:
   a contact input,
   a measurement module configured to determine a sensed property value indicative of a sensed property of the fluid based on the motion of the flowtube, and
   a zero-checker module configured to determine a calibration value based on the sensed property value over a pre-determined time period during which the fluid contained in the flowtube is actually stationary;
   a first switch configured to activate the zero-checker module, the switch coupled to the transmitter through the contact input, and;
   wherein the first switch is configured to close the flowtube such that the fluid contained in the flowtube is stationary, and
   a second switch is configured to deactivate the zero-checker module and to open the flowtube such that the fluid contained in the flowtube flows.

2. The system of claim 1, further comprising a casing that surrounds the transmitter; and
   a removable lid that encloses the transmitter in the casing, the removable lid configured to allow access to the first switch and the second switch while protecting the transmitter.

3. The system of claim 2 wherein the system further comprises a display and the display is configured to present the calibration value.

4. The system of claim 3, wherein the display is enclosed in the casing by the lid.

5. The system of claim 1, wherein the calibration value comprises the sensed property value of the fluid while the fluid is stationary.

6. The system of claim 5, wherein the sensed property value is indicative of a sensed mass flow of the fluid contained in the flowtube and the sensed property value has a value other than zero.

7. The system of claim 1, wherein the calibration value comprises a predetermined value.

8. The system of claim 1 further comprising:
   drivers controlled by the transmitter that cause the motion of the flowtube, and
   sensors configured to sense the motion of the flowtube.

9. The system of claim 1, wherein:
   the measurement module determines the sensed property value when the fluid is flowing, and
   the transmitter determines a corrected property value by determining a difference between the sensed property value when the fluid is flowing and the calibration value.

10. The system of claim 1 wherein the transmitter further comprises a pulse output module configured to generate signals representative of the sensed property value.

11. The system of claim 1, wherein:
    the calibration value is displayed in response to a selection of the first switch, and
    the zero-checker module determines the calibration value based on an average of the sensed property value determined over the pre-determined time period.

12. The system of claim 1, further comprising:
    a communications interface configured to communicate commands between a computer and the transmitter; and
    wherein the contact input is configured to communicate with the zero-checker module.

* * * * *